United States Patent
Hauber et al.

(10) Patent No.: US 10,479,728 B2
(45) Date of Patent: *Nov. 19, 2019

(54) STRUVITE-K AND SYNGENITE COMPOSITION FOR USE IN BUILDING MATERIALS

(71) Applicant: CertainTeed Gypsum, Inc., Malvern, PA (US)

(72) Inventors: Robert J. Hauber, Land O Lakes, FL (US); Gerald D. Boydston, Cody, WY (US); Nathan Frailey, Cody, WY (US); Severine Lamberet, Gagny (FR); Gaurav V. Pattarkine, Shrewsbury, MA (US); Isaac K. Cherian, Shrewsbury, MA (US); Sergio Centurione, North Grafton, MA (US); Anirban Ghosh, Cambridge, MA (US)

(73) Assignee: CertainTeed Gypsum, Inc., Malvern, PA (US)

( * ) Notice: Subject to any disclaimer, the term of this patent is extended or adjusted under 35 U.S.C. 154(b) by 482 days.

This patent is subject to a terminal disclaimer.

(21) Appl. No.: 15/028,372

(22) PCT Filed: Oct. 14, 2014

(86) PCT No.: PCT/US2014/060518
§ 371 (c)(1),
(2) Date: Apr. 8, 2016

(87) PCT Pub. No.: WO2015/057732
PCT Pub. Date: Apr. 23, 2015

(65) Prior Publication Data
US 2016/0236979 A1 Aug. 18, 2016

Related U.S. Application Data

(63) Continuation-in-part of application No. 14/457,826, filed on Aug. 12, 2014, now Pat. No. 9,422,193.
(Continued)

(51) Int. Cl.
*C04B 28/34* (2006.01)
*C04B 12/02* (2006.01)
(Continued)

(52) U.S. Cl.
CPC .......... *C04B 11/28* (2013.01); *C04B 12/025* (2013.01); *C04B 12/027* (2013.01);
(Continued)

(58) Field of Classification Search
CPC ....... C04B 11/00; C04B 28/34; C04B 14/304; C04B 22/062; C04B 22/142; C04B 11/28;
(Continued)

(56) References Cited

U.S. PATENT DOCUMENTS 2,033,159 A 3/1936 Storch et al.
2,562,859 A 7/1950 Camp
(Continued)

FOREIGN PATENT DOCUMENTS

DE 3326796 C1 11/1984
DE 3914796 5/1990
(Continued)

OTHER PUBLICATIONS

K. Simkiss, M.G. Taylor, "Calcium Magnesium Phosphate Granules: Atomic Simulations Explaining Death", Journal of Experimental Biology vol. 190; pp. 131-139 (1990).
(Continued)

*Primary Examiner* — Shuangyi Abu Ali
(74) *Attorney, Agent, or Firm* — McDonnell Boehnen Hulbert & Berghoff LLP (57) ABSTRACT

A composition and process for manufacture thereof used in hybrid inventive building materials comprising Syngenite ($K_2Ca(SO_4)_2 \cdot H_2O$) and Struvite-K ($KMgPO_4 \cdot 6H_2O$). Starting constituents include magnesium oxide (MgO), monopotassium phosphate (MKP) and stucco (calcium sulfate hemihydrate), mixed in predetermined ratios, cause reactions to proceed through multiple phases, which reactions variously are proceeding simultaneously and in parallel. Variables, e.g., water temperature, pH, mixing times and rates, have
(Continued)

been found to affect resultant reaction products. Preferred ratios of chemical constituents and manufacturing parameters, including predetermined weight percent and specified ratios of Struvite-K and Syngenite are provided for building products used for specified purposes. Reactions are optimized in stoichiometry and additives to reduce the combined heat of formation to non-destructive levels. Various additives help control and guide reactions. Building products, such as board panels, include the resultant composition. A significant amount of the composition is disposed adjacent a building panel face.

18 Claims, 4 Drawing Sheets

Related U.S. Application Data (60) Provisional application No. 61/890,702, filed on Oct. 14, 2013, provisional application No. 61/890,720, filed on Oct. 14, 2013, provisional application No. 61/892,581, filed on Oct. 18, 2013, provisional application No. 61/915,601, filed on Dec. 13, 2013, provisional application No. 61/892,025, filed on Oct. 17, 2013, provisional application No. 61/865,029, filed on Aug. 12, 2013.

(51) Int. Cl.
*C04B 11/28* (2006.01)
*C04B 22/06* (2006.01)
*C04B 22/14* (2006.01)
*C04B 22/00* (2006.01)
*C04B 24/42* (2006.01)
*C04B 111/00* (2006.01)

(52) U.S. Cl.
CPC ........ *C04B 22/0013* (2013.01); *C04B 22/141* (2013.01); *C04B 24/42* (2013.01); *C04B 28/34* (2013.01); *C04B 2111/0062* (2013.01)

(58) Field of Classification Search
CPC ................ C04B 12/025; C04B 12/027; C04B 2111/0062; C04B 2111/28; C04B 22/0013; C04B 22/066; C04B 22/141; C04B 24/42; C04B 28/344
See application file for complete search history.

(56) References Cited

U.S. PATENT DOCUMENTS

| | | | |
|---|---|---|---|
| 2,526,537 A | 10/1950 | Camp | |
| 3,179,529 A | 4/1965 | Hickey et al. | |
| 3,454,456 A | 7/1969 | Wiley | |
| 4,504,555 A | 3/1985 | Prior et al. | |
| 4,604,318 A | 8/1986 | Prior et al. | |
| 5,035,872 A | 7/1991 | Loblich et al. | |
| 5,194,087 A | 3/1993 | Berg | |
| 5,256,222 A | 10/1993 | Shepherd et al. | |
| 5,830,815 A | 11/1998 | Wagh et al. | |
| 5,846,894 A | 12/1998 | Singh et al. | |
| 6,136,088 A | 10/2000 | Farrington | |
| 6,251,979 B1 | 6/2001 | Luongo | |
| 6,319,312 B1 | 11/2001 | Luongo | |
| 6,340,388 B1 | 1/2002 | Luongo | |
| 6,391,958 B1 | 5/2002 | Luongo | |
| 6,403,688 B1 | 6/2002 | Luongo | |
| 6,998,012 B2 | 2/2006 | Koelicker et al. | |
| 7,045,476 B1 | 5/2006 | Lally | |
| 7,407,545 B2 | 8/2008 | Wallner | |
| 7,429,290 B2 | 9/2008 | Lally | |
| 7,491,267 B2 | 2/2009 | Francis | |
| 7,740,700 B2 | 6/2010 | Wallner | |
| 7,744,693 B2 | 6/2010 | Mabey | |
| 7,867,597 B2 | 1/2011 | Feigin et al. | |
| 7,914,914 B2 | 3/2011 | Tinianov | |
| 7,955,587 B2 | 6/2011 | College | |
| 8,337,993 B2 | 12/2012 | Surace et al. | |
| 8,397,864 B2 | 3/2013 | Tinianov | |
| 8,623,304 B2 | 1/2014 | Saito et al. | |
| 2002/0017222 A1 | 2/2002 | Luongo | |
| 2003/0010258 A1 | 1/2003 | Fukuda et al. | |
| 2003/0084980 A1 | 5/2003 | Sufert et al. | |
| 2005/0229809 A1 | 10/2005 | Lally | |
| 2006/0035112 A1 | 2/2006 | Veeramasuneni et al. | |
| 2007/0022913 A1 | 2/2007 | Wang et al. | |
| 2009/0000806 A1 | 1/2009 | Tinianov | |
| 2010/0101457 A1 | 4/2010 | Surace et al. | |
| 2010/0247937 A1 | 9/2010 | Liu et al. | |
| 2011/0061324 A1 | 3/2011 | Tinianov | |
| 2012/0100295 A1 | 4/2012 | Dubey | |
| 2013/0062289 A1 | 3/2013 | Cote et al. | |
| 2013/0074736 A1 | 3/2013 | Gill | |
| 2015/0158766 A1 | 6/2015 | Teng et al. | |

FOREIGN PATENT DOCUMENTS

| | | |
|---|---|---|
| DE | 3914796 C1 | 5/1990 |
| IL | 59066 A | 7/1983 |
| JP | 4-164853 | 6/1992 |
| WO | 2006115496 A1 | 11/2006 |
| WO | 2011038277 A1 | 3/2011 |
| WO | 2012122102 A2 | 9/2012 |

OTHER PUBLICATIONS

Du Cai-yi, Yan Yun, Hu Zhi-hua, Xie Xiao-I i 1 , Wang Su-juan, "Study on New Type Phosphogypsum Lightweight Porous Material", Journal of Building Materials, vol. 11, No. 3, pp. 353-358, with English Translation.
L.F. Amaral, I.R. Oliveira, P. Bonadia, R. Salomao, V.C. Pandolfelli, "Chelants to inhibit magnesia (MgO) hydration", Ceramics, International, vol. 37, pp. 1537-1542 (2011).
Zhu Dinga, Biqin Donga, Feng Xinga, Ningxu Hana, Zongjin Li, "Cementing mechanism of potassium phosphate based magnesium phosphate cement", Ceramics, International, vol. 38, pp. 6281-6288 (2012).
Hammi, H. et al. "Optimisation of the preparation of a phosphomagnesium cement based on struvite and K-struvite", MATEC Web of Confrences3, 01071 (2013).
S. Zhang, H.S. Shi, S.W. Huang, P. Zhang, "Dehydration characteristics of struvite-K pertaining to magnesium potassium phosphate cement system in non-isothermal condition" Journal of Thermal Analysis and Calorimetry vol. 111, pp. 35-40 (2013).
WIPO International Search Report for corresponding PCT Appln. No. PCT/US2014/06518, EPO, dated Jan. 30, 2015.
Terry Ramlochan, "Early Age Reactions of Sulphate Phases that Contribute to Early Stiffening of Hydraulic Cements," presented at International Summit on Cement Hydration Kinetics and Modeling, Quebec City, Jul. 2009.
Prosecution history as of Sep. 5, 2018 of copending U.S. Appl. No. 15/239,145, filed Aug. 17, 2016 (provided without references).
Prosecution history of U.S. Pat. No. 9,422,193, issued Aug. 3, 2016 (Provided without references).

STRUVITE-K AND SYNGENITE COMPOSITION FOR USE IN BUILDING MATERIALS

CROSS REFERENCE TO RELATED APPLICATIONS

This is a National Phase application under 35 USC § 371 of PCT Application No. PCT/US2014/060518 (WO2015/057732A1), which relies for priority on U.S. patent application Ser. No. 14/457,826 filed on Aug. 12, 2014, itself relying for priority on U.S. Provisional Application No. 61/890,702, filed on Oct. 14, 2013; on U.S. Provisional Application No. 61/890,720, filed on Oct. 14, 2013, U.S. Provisional Application No. 61/892,025, filed on Oct. 17, 2013, on U.S. Provisional Application No. 61/892,581, filed on Oct. 18, 2013, and on U.S. Provisional Application No. 61/915,601, filed on Dec. 13, 2013, all provisional applications having expired, the entire specifications of which are incorporated by reference as if fully set forth herein.

BACKGROUND OF THE INVENTION

1. Field of the Invention

This invention relates generally to building materials and more specifically to building materials in which a desired final composition and ratio of Struvite-K and Syngenite, two minerals not normally found together, is provided to impart specified and predetermined properties and characteristics to the building materials.

2. Background Art

For approximately three thousand years, and at least since Roman times, magnesium oxide (MgO) based cements have been used to build walls and structures. Within the last 50 years, improved magnesium oxide containing materials have been used for batch manufacture of slurries that are then poured into panel molds where they are allowed to cure for an extended period of time. The resulting products impart rigidity and structural integrity to the panel and thereby allow the panel to be fastened to wall assemblies.

Wallboard typically has a density range of from about 1,600 pounds (lbs.) to about 1,800 lbs. per thousand square feet (lbs/MSF) (about 7.8 kilograms (kg) to about 8.3 kg per square meters ($m^2$)) of about one-half inch (1.27 cm) board. Heavy or high-density gypsum wallboards are costly and more difficult to manufacture, transport, store, and manually install at job sites. The recent trend has been toward lighter or low-density boards. While wallboards having reduced densities through adding lightweight fillers and foams are known, wallboard having a density of less than about 1,600 lbs/MSF (about 7.8 kg per $m^2$) in a one-half inch (1.27 cm) board, may reduce the strength and integrity of the resulting board. Because extra high-density or heavy gypsum wallboard generally is not desirable for the reasons set forth above, research and development are proceeding apace in order to produce reduced weight or density boards without sacrificing board integrity and strength. One method of reduction of board weight is to use novel or non-gypsum materials for the core of the boards.

Struvite [$(NaH_4(PO_4) \cdot 6(H_2O)$] has been known as a naturally occurring mineral for over a century, and has been the subject of study in the health process of animals and sewage treatment. See, for example, US Published Patent Appl. No. 2013/0062289, among others. A more recent development has resulted in a similar, albeit artificially created, mineral, alternatively known as K-Struvite, Struvite-K or Struvite (K) (hereinafter "Struvite-K"), having the chemical formula [$KMg(PO_4) \cdot 6(H_2O)$]. This essentially man-made mineral has been the subject of intense study because many of its salient characteristics, including its orthorhombic crystal structure, glassy sheen, which permits substantially friction free motion, and resistance to heat transfer, have been found very suitable in the building industry.

Because of these and other properties, and from the desire in the building and construction industries to find a feasible alternative to gypsum boards as internal building materials, Struvite-K has been determined to provide a good heat resistant building board panel while remaining slightly elastic and providing ease of manufacture on a mass scale comparable to that of gypsum board.

It is well known that such magnesium oxychloride containing panels are more expensive, usually amounting to twice to three times the cost of traditional gypsum building panel alternatives, see for example, US Pat Pub. Nos. 2013/0115838 published on May 9, 2013. Therefore, these types of boards are not widely accepted as cost affordable building materials for wall boards or panels. Moreover, some magnesium oxychloride containing building panels produce free chlorine gas within the board material, and thus present major issues, such as leaching, foul odors, fastener and building structure corrosion. In addition, many of these types of boards will breakdown and decompose over time, as they are not chemically stable. These types of boards and panels are particularly susceptible to long term water exposure, and are prone to fall apart under long exposures to such conditions.

In recent years, environmental and health safety driven building codes have mandated that only building materials capable of offering improved water resistance and or fire resistance can be used in certain construction structures and building methods. As a result, paperless gypsum and traditional cement building panels have evolved to satisfy these requirements. However, gypsum is not and cannot ever be water proof and or completely water resistant. Therefore, it is necessary that water resistant compounds, such as waxes or silicones, be added to their formulation to impart acceptable water resistance. This may be a costly and perhaps unnecessary addition.

Moreover, the traditional fiber cement and Portland cement building panels are extremely difficult to handle and work with when used in traditional building practices, and thus require more time, labor and specialized tools to prepare and install these types of building panels.

More recently, the international economic situation has affected the building and construction markets. Consequently, construction companies have been driven to seeking alternative building materials that offer improved performance characteristics that are at least an order of magnitude greater than those of traditional gypsum and cement building materials, while simultaneously matching the cost effectiveness of gypsum and cement building materials.

This invention addresses the simultaneous tension between cost and effectiveness, while providing for a method of using a continuous board line. The dual considerations of functional effectiveness and reduction of costs, in the context of improved and engineered building materials designed to serve specific purposes, would provide an ideal building material if all the considerations are adjusted to obtain such boards or panels. None of the heretofore disclosed known prior art building board compositions can provide these capabilities. None of the prior art methods known heretofore teach the inventive process of forming composite boards containing synthetic Struvite-K and Syngenite in specified ratios so as to provide desired characteristics and features on wall board panels, utilizable to provide an ultra-lightweight board or building panel, that is moisture and fire resistant.

SUMMARY OF THE INVENTION

Accordingly, there is provided herein a new and improved composition and process for the production of a novel building material, comprising as starting constituent compounds magnesium oxide (MgO), monopotassium phosphate (MKP) and calcium sulphate including stucco (calcium sulfate hemihydrate). The reaction products, Syngenite ($K_2Ca(SO_4)_2.H_2O$) and Struvite-K ($KMgPO_4.6H_2O$) proceed through multi phase reactions, at times occurring simultaneously. The reactions are basic in the case of the hemihydrate and water and acidic for the Magnesium Oxide/MKP, both reactions taking place simultaneously and in parallel and may even compete with each other if the Struvite-K reaction is not buffered (rate slowed down) to allow the hemihydrate enough time and water to fully rehydrate. It is considered that the Syngenite reaction (typically an exothermic reaction) will reach a maximum temperature of 109-186° F. (42°–86° C.),—depending on the purity of the hemihydrate, and its concentration). In this case the first co-reacting temperature rise is an endothermic reaction and the formation of Syngenite is taking place as a product of dissolution from the MKP-K, which is liberated from the MKP and together with the forming hemihydrate forms $K_2Ca(SO_4)_2.H_2O$ (Syngenite) before the Struvite-K nears its own initial temp rise (an exothermic reaction—temperatures can hit a maximum of 212 F.° (100° C.) with some reactions observed to exceed these temperatures). This temperature rise, if left unchecked, may pose a major destructive effect to the hemihydrate portion of the formed Syngenite, even after it becomes fully rehydrated. The invention disclosed and claimed herein is a preferred set of ratios of chemical constituents and a method of manufacture of board panels using a continuous line including predetermined and specified ratios of Struvite-K and Syngenite for specified purposes, optimized in respect of stoichiometry to reduce the combined heat of formation to non-destructive levels and additionally, a method of manufacture of board panels utilizable in building construction that is fire and moisture resistant, as well as a variety of board products made according to these methods and using the inventive materials.

Figure 1:
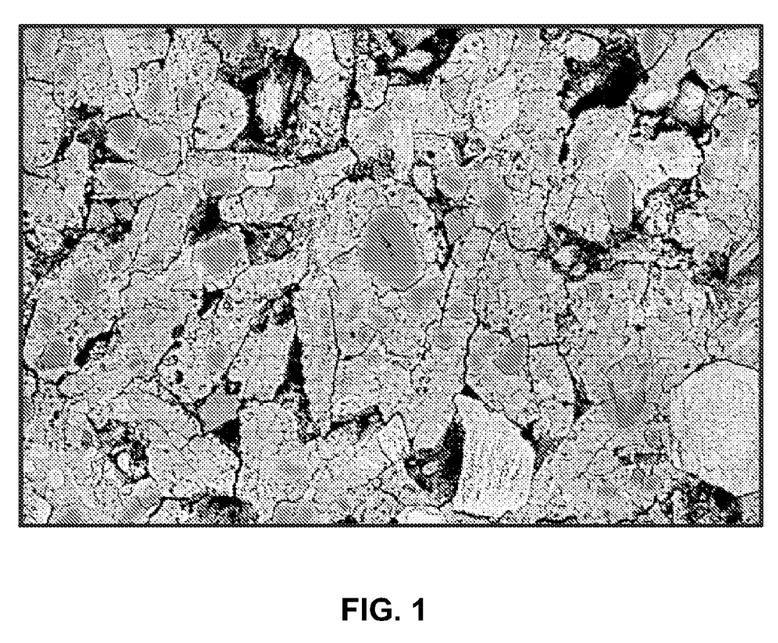
FIG. 1 is photomicrograph of a void in the resulting material developed in one of the tested formulations to determine the local structure of the resultant reaction products.

In one sample, the core mechanism has stoichiometric amounts of MgO and $KH_2PO_4$ in the presence of water and hemihydrate stucco to obtain Struvite-K and Syngenite and other amorphous by-products. This mechanism is considered to follow the reaction:

$MgO+KH_2PO_4+CaSO_4.\frac{1}{2}H_2O \rightarrow KMgPO_4.6H_2O+ K_2Ca(SO_4)_2.H_2O.$ In another embodiment, together with the initial constituents and trace additives, the reaction may comprise several subreactions, but the overall general reaction follows the mechanism:

$3MgO+3KH_2PO_4+2CaSO_4.\frac{1}{2}H_2O+ 3H_2O \rightarrow KMgPO_4.6H_2O+K_2Ca(SO_4)_2.H_2O+ Ca^{+2}+2Mg^{+2}+2(PO_4)^{-3}$ in the presence of Boric Acid ($H_3BO_3$), Naphthalene Sulfonate, Sulfuric Acid ($H_2SO_4$) and a siloxane, such as polydimethylsiloxane or poly(methyl hydrogen) siloxane. It should be noted that the above reaction is not yet considered to complete total reaction product mixtures, and the stucco hemihydrate ($CaSO_4.\frac{1}{2}H_2O$) will remain in excess. It is considered that the remaining ionic materials, i.e., ($Ca^{+2}$, 2 $Mg^{+2}$ and $2(PO_4)^{-3}$) will either react with the remaining stucco or will form salt agglomerations upon drying. It is considered that at least some of the stucco hemihydrate and the Magnesium Oxide remain unreacted, and these constituents remain in an amorphous, randomly distributed matrix within the crystalline structures that are presented by the reacted Struvite-K and Syngenite, as shown in FIG. 1.

It should further be noted that the constituent materials may be provided in varying predetermined ratios, and may be included in specified ratios for the main constituents MgO:MKP as a 1:1 ratio up to a ratio of 1:3.4. Thus, although the constituent materials identified above and the resultant reactant products are shown as having specified ratios, it should be understood that varying the initial constituent ratios, as has been done in trials described below, changes the reaction products and the amounts of reacted and unreacted constituents. Specified weight percent ranges are provided for in the following proportions:

MgO: 3.33 to 70.00%
$KH_2PO_4$: 4.67 to 70.00%
$CaSO_4.\frac{1}{2}H_2O$: 10.5 to 90.0% adding up to 100%.

In a more refined ratio of the constituent starting materials, the following proportions are preferred:

MgO: 10.0 to 40.0%
$KH_2PO_4$: 40.0 to 70.00%
$CaSO_4.\frac{1}{2}H_2O$: 25.0 to 75.0% adding up to 100%.

To both of these solid constituent mixtures, water is added to commence the reaction in the proportion in a range of from 100:20 up to 100:40 weight percent of solid constituents to water. In a preferred form of the reaction, it is carried out in a reaction mixer in a continuous process, and the resulting slurry comprising mostly Struvite-K, Syngenite, gypsum, and some potentially unreacted constituents provides a semi-liquid paste that is used in association with or without a gypsum core to provide one or more gypsum board products. In an optimal formulation, the ratio of MgO:MKP is from between 1:1.8 to 1:2.2, and in a most optimal formulation most closely most approximates 1:2.0.

In another embodiment, there is disclosed and claimed herein empirically derived ratios of constituent materials and guidelines for defining the process parameters in the manufacturing process of building materials containing unique building compositions including the minerals Struvite-K and Syngenite. These preferred ratios define the reactant composition of magnesium oxide (MgO), a phosphate and a potassium containing reactant, such as monopotassium phosphate ($KH_2PO_4$), and hemihydrate alpha and/or beta gypsum ($CaSO_4.\frac{1}{2}H_2O$), in solution with water ($H_2O$), together with judicious use of thermodynamic and kinetic properties of these chemical reactions, to guide the reactions in the desired direction and thereby to obtain the unique building materials having the desired physical properties.

The mathematical ratios utilize thermodynamic and stoichiometric principles and are grounded in the laws of conservation of atomic composition, energy and mass. The mathematical ratios use a desired composition in the final product building materials containing Struvite-K and Syngenite and provide the following process parameters to within an accuracy of 5% of the actual process conditions:

1. Thermodynamic quantities of the process, including but not limited to the Gibb's free energy of formation, the enthalpy of formation, and the entropy of formation;
2. Rheology of the mixture, including but not limited to the density and viscosity;
3. Reactant masses and/or ratios of magnesium oxide (MgO), monopotassium phosphate ($KH_2PO_4$), stucco, in the form of Hemihydrate Alpha and or Beta gypsum ($CaSO_4 \cdot \frac{1}{2}H_2O$) and water ($H_2O$);

4. Process conditions, including but not limited to temperatures and pressures of reaction, water content, mixing rate, mixing time, and pH.

Using appropriate mathematical equations, a user may determine a great variety of possible formulas and process iterations toward providing unique building materials containing Struvite-K ($KMg(PO_4) \cdot 6(H_2O)$) and Syngenite ($K_2Ca(SO_4)_2 \cdot H_2O$), all in accordance with the disclosure of the chemical reactions disclosed in aforementioned co-pending U.S. patent application Ser. No. 14/457,826, and U.S. Provisional Application Nos. 61/865,029 and 61/892,581. Use of the processes and innovative methods described herein can provide cost efficient, ultra low weight wallboards having enhanced performance capabilities, such as mechanical strength, fire and moisture resistance and antimicrobial properties.

Certain qualitative trends can be seen from preliminary lab results and scientific deductive reasoning using known scientific principles. The above listed 5 process conditions may be used to predict the necessary starting conditions based on the yields of Struvite-K and Syngenite desired in the final mixture. The possible modifications of the initial parameters will now be described in greater detail to show the effect of how varying any one particular parameter will change the ultimate resulting composition derived from the starting constituents.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

The inventive chemistry is set forth in the aforementioned patent applications, and is repeated below. To be avoided in the reaction is the overwhelming heat that the Magnesium Phosphate reaction generates exothermically which inhibits the simultaneously occurring stucco rehydration reaction and avoids generation of excessive amounts of amorphous gypsum hemihydrate as an unwanted by-product. Thus, to provide an appropriate buffer is considered essential. Boric acid is ideal to retard the Magnesium Phosphate reaction, while it also serves as a mechanism to protect gypsum recrystallization against the adverse effects of thermal shock when the Magnesium Phosphate begins to form.

Use of sulphuric acid ($H_2SO_4$) to pre-treat the water provides a more acidic solvent and thus further accelerates the Struvite-K reaction. To reduce costs of materials, use is made of stucco, inducing as much as 90% by weight of the overall formulation, as a replacement co-reactant. The stucco replaces predetermined amounts of Magnesium Oxide and monopotassium phosphate (MKP), which significantly reduces cost, since the gypsum stucco is cheaper and lighter weight than these materials.

As a by-product and a point of unexpected discovery, another important mineral, Syngenite, is also generated in the stucco reaction. Syngenite is more fire resistant than gypsum. However, Syngenite by itself is not as strong and fire resistant as the combination of Struvite-K and Syngenite. Syngenite also provides an incidental benefit as a compositing factor between the Magnesium Phosphate and the gypsum hemihydrate, whereby it incorporates plasto-elastomeric characteristics, thereby rendering the final product significantly less brittle and more flexible, increasing manipulability, and making the board easier to score/cut. This is a significant improvement over known Magnesium "Oxychloride" boards, for example, such as those described in U.S. Pat. Pub. 2013/0115835 and Portland cement based cement building panels.

Additionally and ideally, silicone is added to the mix to achieve four other complementary benefits,
1) forming a catalyzed silicone in the presence of the Magnesium Phosphate and acids
2) providing a mechanism for thermal resistance to the gypsum and permits recrystallization of the Magnesium Phosphate
3) serving to retard the Magnesium Phosphate reaction, and
4) providing a defoaming material to break down any foam that may be generated as a byproduct of the reaction of the Sulfuric Acid with $CaCO_3$, which is a known impurity in natural gypsum. Increasing the amount of silicone addition further imparts substantial water resistance to the board, and in increase in catalyzed silicone even more so. Total water resistance has been increased using significantly a lesser amount of silicone than is typically used/required to meet ASTM performance requirements for wet area building panels. Testing has shown that a maximum absorption rate of ≤2% may be achieved, while typically results on conventional water resistant gypsum wallboard, glass-reinforced gypsum boards, produce on average absorption that is at best 3.5% to 4% total water resistance.

However, the materials generated as a result of the present invention are by their nature water resistant and do not breakdown in the presence of water as would, for example, Magnesium Oxychloride boards or traditional gypsum boards, which require the incorporation of water resistant additives, such as wax or silicone. Incorporation of a Polysiloxane in the present formulations restrains water wicking into the open areas and through the matrix of the products made in accordance with the present invention, essentially making it water impervious to an extent that water is no longer able to wick into the material. Moreover, even when bulk water or vapor water either wicks into or is transferred into the material/materials generated according to the present invention, it has no detrimental effect thereon and the material maintains its original strength. So as to prevent the intrusion of bulk or vapor water into and throughout the inventive compositions, a Polysiloxane is added only if complete water imperviousness is a requirement, for example, such as in regions and localities where building codes have driven the specification.

One method of using Struvite-K in building materials has been suggested for use in roads in replacement of Portland Cement. See for example: "Optimisation of the preparation of a phosphomagnesium cement based on struvite and K-struvite" H. Hammi and A. Mnif, Laboratoire de Valorisation des Matériaux Utiles, Centre National de Recherches en Sciences des Matériaux, Technopole Borj Cedria, Soliman, Tunisie, MATEC Web of Conferences Vol. 3, page 01071 (2013). Such compounds have also been found to be useful in the production of other building materials, such as wallboard panels, ceiling tiles, etc. Such uses require the efficient, timely and inexpensive production such that they can be incorporated into the structural members in which they are being used.

It has been noted that the production of such compounds and their ability to set in a timely fashion is dependent on the stoichiometry of the various precursors to the final set product, which is essentially in the form of $KMg(PO_4) \cdot 6(H_2O)$. That is, it has been found as a surprising and unexpected result that the ratios of ingredients as follows will provide the best results in the desired characteristics:

The following scientific principles are implement to assist in driving the rapidity and direction of the reactions:
1. Thermodynamic principles:
   a. The Gibb's free energy of formation, the enthalpy of formation, and the entropy of formation all indicate the dominance of the Struvite-K and Syngenite reactions
2. Rheology of the reaction mixture:
   a. The density and viscosity of the mixture increase as higher Struvite-K yields are produced.
3. Reactant masses and stoichiometric considerations:
   a. The ratio of MKP:MgO will increase as higher Struvite-K yields are produced until the ratio of MKP:MgO reaches, but does not exceed, 3.37:1.
   b. Stucco (gypsum hemihydrate)—the stucco requirement will not be affected by variation of other elements providing for higher Struvite-K yields, as stucco does not take part in this reaction.
   c. Water—the water requirement will increase as higher Struvite-K yields are produced until the mass ratio of monopotassium phosphate ($KH_2PO_4$) to water ($H_2O$) equals 2.96:1, from stoichiometric considerations.
4. Process Reaction Conditions:

Water content, mixing rate, mixing time, pH, and temperature of the water are all considered as significant factors in the resultant products and by-products.

The chemical reaction providing the optimum results has been determined to be:

The Struvite-K Reaction is an exothermic reaction and proceeds very rapidly. The basic core reaction is represented by:

$$MgO+KH_2PO_4+5H_2O \rightarrow KMg(PO_4) \cdot 6(H_2O).$$

The Syngenite Reaction is broken up into two separate subtractions, the basic mechanism being represented by:

$$2CaSO_4 \cdot \tfrac{1}{2}H_2O \rightarrow H^+ + \tfrac{1}{2}O^{2-} + 2Ca^{2+} + 2SO_4^{2-} \text{ and}$$

$$Ca^{2+} + 2SO_4^{2-} + 2K^+ + H_2O \rightarrow K_2Ca(SO_4)_2 \cdot H_2O + CaSO_4.$$

The precise reaction mechanism remains under study, and that certain reaction parameters, such as pH, water temperature, and timing of mixing and additions, have been explored as set froth above. The initial process parameters are considered to affect the reaction rates, products and final structures. Continued study and data derived therefrom is expected to provide a basis that will enable customization of the reaction products and extent of completion of the reaction, as may be desired for specific applications.

In the current invention, it has been found that the degree and length of mixing plays a significant role, but as a secondary order of magnitude. Both how the reaction proceeds and the ultimate yield of Syngenite and Struvite-K are considered to be affected. Using the ratios as provided above, it has been found that minimal mixing yields higher ratios of Syngenite and longer mixing yields higher ratios of Struvite-K. Unexpectedly, it was discovered that a short mixing period enables a first, low temperature generating exothermic reaction and, when the mixing is stopped minimally after 30 seconds to one minute, complete set/hardening of the slurry can take up to 50 minutes. X-Ray Diffraction (XRD) tests have indicated that samples mixed this way yield higher amounts of Syngenite than Struvite-K, as well as elevated ratios of unreacted MgO (Periclase has been observed) and Bassanite ($CaSO_4 \cdot \tfrac{1}{2}H_2O$). Though each sample appeared to be set after this short mixing, in fact it was unexpectedly discovered that the sample had only formed a shell around an unset—still fluid—inner core, and that the sample maintained a temperature around 86° F. (30° C.). The shell was broken open and all materials were found to go back into solution immediately when mixed with the still fluid inner core material. Further mixing for an additional 30 to 40 seconds instigated a second reaction—an exothermic reaction wherein the temperature was observed to climb to a maximum of 212° F. (100° C.), initially thought to be indicative of a magnesium phosphate reaction. However, following an XRD test on this sample material, it was determined to comprise Struvite-K.

Subsequent prolonged multi and single stage hand mixing and high speed mixing of follow-up samples composed/formulated with an identical formulation as listed below, demonstrated dramatically elevated Struvite-K yield ratios.

| 3MgO | + | 3KH$_2$PO$_4$ | + | 2CaSO$_4$·1/2H$_2$O | + | 3H$_2$O | → | KMgPO$_4$·6H$_2$O | + | K$_2$Ca(SO$_4$)$_2$·H$_2$O | + | Ca$^{+2}$ | + | 2Mg$^{+2}$ | + | 2(PO$_4$)$^{-3}$ |
|---|---|---|---|---|---|---|---|---|---|---|---|---|---|---|---|---|
| Magnesium Oxide | | MKP | | Hemihydrate Stucco | | Water | | Struvite - K | | Syngenite | | Calcium Ion | | Mg Ion | | Phosphate Ion | the reaction occurring in the presence of small amounts of $H_2SO_4$, $H_3BO_3$, acting to control the reaction rate, and including one or more siloxanes to restrain water wicking. Although lingosulfaonate or corboxylate forms are usable, Naphthalene Sulfonate is preferred as a fluidizer.

XRD results demonstrate the benefit of prolonged mixing of the 1:2:1 MgO:MKP:Stucco and resulting ratios are set forth below. Table 1 shows the mixing process of the same constituent materials and ratios (MgO:MKP:Stucco) to show repeatability of the reaction rate products.

TABLE 1

| Samples | $KMgPO_4 \cdot 6H_2O$<br>(Struvite-K)<br>(PDF-00-035-0812) | $K_2Ca(SO_4)_2 \cdot H_2O$<br>(Syngenite)<br>(PDF-00-028-0739) | Unreacted MgO<br>(Periclase)<br>(PDF-00-045-0946) | $CaSO_4 \cdot 0.67H_2O$<br>(Bassanite)<br>(PDF-00-047-0964) |
|---|---|---|---|---|
| A | 67.1 | 25.0 | 6.6 | 1.2 |
| B | 66.4 | 25.8 | 7.1 | 0.7 |
| C | 66.0 | 26.4 | 6.9 | 0.6 |
| D | 66.0 | 26.4 | 6.9 | 0.6 |

Mixing as described above in combination with the specific formulation shown above and raw material addition variations detailed below result in the novel and unexpected discovery, distinguishing previously known magnesium oxide or magnesium oxychloride type boards.

Combining the formulation above with suitable changes to the following ranges imparts improved economic efficiencies relating to large scale Struvite-K yield as a result of the process/formulation.

Figure 3:
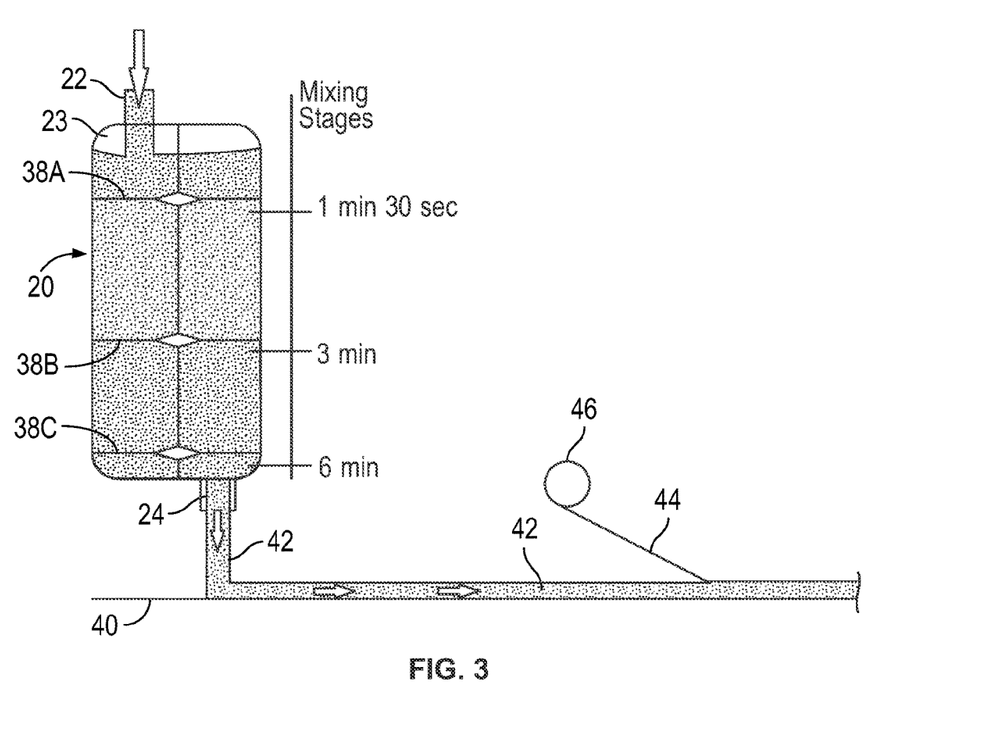
FIG. 3 is a schematic plan view showing in cross-section a plug flow mixer reactor such as may be utilized in the production of the inventive compositions of matter.

For generating more Struvite-K than Syngenite, the following method is used:

a. Using a multi-stage mixing apparatus, such as a plug flow mixer as shown in FIG. 3, multilevel pen or scraper mixer, or combination thereof, or alternatively using only a mixer that allows for a long dwell time with raw material supply and feed-through/output to control equivalent to a manufacturing speed for a typical 4 foot wide and ¼ to 1" thick board ranging from approximately a minimum of 20 feet/min to a maximum of 750 feet/min, the raw materials are mixed and combined within the mixer as follows: (Dwell time must be equal to or greater than and min of 4 minutes and a max of 12 minutes). Less than 17.2% Magnesium Oxide (MgO) from one or more appropriate sources, such as light dead burned, medium dead burned, hard dead burned MgO, are intended to optimize and reduce raw material cost meanwhile yielding both efficient and optimal performance features in the result composite generated slurry formulation.

A greater amount of Mono-Potassium Phosphate (MKP) or alternatively Potassium Dihydrogen Phosphate—$KH_2PO_4$ (KDP) of at least 34.5% will increase the molar ratio of Magnesium Oxide (MgO) to potassium Dihydrogen phosphate and also will cause a reduction in the rate of reaction via reduced rate of dissociation. The preferred MKP or KDP may be either of food grade or agricultural grade.

At least 17.2% Beta Hemihydrate Stucco, that is, processed stucco—$CaSO_4 \cdot \frac{1}{2} H_2O$) added as a co-reactant which generates an initial reaction with the MKP or DKP. This reaction slows the continuing co-reaction ($Ca^{2+}+2SO_4^{2-}+2K^++H_2O \rightarrow K_2Ca(SO_4)_2 \cdot H_2O+CaSO_4$) via an initial rehydration/uptake of associated water. This initial step generates a first temperature rise from the exothermic reaction, to counter the endothermic reaction with the potassium (setting off a dissolution of the K from the MKP to join with the forming dihydrate to form Syngenite). The Hemihydrate stucco may have a purity range of from minimum of approximately 65% to a maximum of 100%. Higher purity hemihydrate stucco improves the uptake of potassium as dihydrate is forming and thereby further slows the secondary $KMgPO_4 \cdot 6H_2O$ (Struvite-K) reaction thus increasing the yield of Struvite-K in the final reaction. Because the exothermic reaction that generates the $KMgPO_4 \cdot 6H_2O$ is hot (up to 212° F. (100° C.) and sometimes above), the rehydrated dihydrate portion of the derived Syngenite calcines to a minor extent. The Potassium (K) that had been used up in the first Syngenite reaction is then released into solution in stages and is ultimately reused in the $KMg_2PO_4 \cdot 6H_2O$ generation process as the continuous reaction proceeds.

About 31.1% $H_2O$ (Water) is introduced as a solute to permit the other reactions to proceed.

Trace remaining additives are preferably introduced to assist the reactions. These all represent less than 1.5% of the overall dry mix in total combined addition.

a. Sulfuric Acid ($H_2SO_4$): is added to the water to change the pH and improve the instigation of the overall acid based reaction.

b. Boric Acid ($H_3BO_3$): Boric Acid is an important additive because it offers a benefit to both endothermic and exothermic reactions. In the first reaction, it serves to protect the hemihydrate to water rehydration from the heat of the secondary $MgO/MKP/H_2O$ reaction, and allows the forming Syngenite to retain association with the Potassium for a longer period. In the case of the $MgO/MKP/H_2O$ reaction, the Boric Acid is a known retarder generally to Magnesium Phosphate Cement reactions, delaying this reaction to reduce thermal shock.

c. Siloxanes, such as Polysiloxane $(C_2H_6OSi)_n$, polydimethylsiloxane $(CH_3[Si(CH_3)_2O]_nSi(CH_3)_3)$, and similar compounds, in very low addition amounts, are provided as a defoamer. The MgO/MKP and any impurity within the Hemihydrate source ($CaCO_3$) reacts with the MgO in the presence of water to cause a foaming reaction that is not desirable. If no impurities are present, the Polysiloxane stays intact throughout the entire course of the first and second reactions, and is utilized as needed for a continuous feed.

d. Naphthalene Sulfonate, such as $C_{10}H_8NNaO_3S$, in very low additive amounts serves as a fluidizer or dispersant for the overall mix.

The purity of Beta Hemihydrate stucco is an additional factor, since higher purity hemihydrate causes the overall reaction to slow down/retard and permits a greater uptake of K, again skewing the initial reaction toward more generation of Struvite-K in the final reaction. The additives in their current disclosed addition ratios should be approximately maintained. Nevertheless, a maximum Struvite-K yield limit is reached. It is noted that decrease of either MgO or MKP additions will yield less Struvite-K. Increase in MgO and or MKP additives should generate equivalent or greater yield ratios of Struvite-K, but to do so requires an increase in the Beta hemihydrate stucco addition or an increase in the hemihydrate stucco purity. In this case the Boric and Sulfuric Acid additions may also be increased to compensate.

The above described process changes the ratios somewhat so that combining the formulations that above with the following ranges will impart improved economic efficiencies relating to large scale Syngenite yield as a result of the process/formulation. In order to generate more Syngenite, the method uses a multi-stage mixing apparatus such as a plug flow mixer, multilevel pin and or scraper mixer or combination and sources of materials are as above. However, changes to the input parameters of the constituent materials skew the reactions toward a different yield result.

Magnesium Oxide (MgO) is provided in amounts greater than 17.2%: MKP or KDP is less than 34.5% and Beta Hemihydrate stucco ($CaSO_4 \cdot \frac{1}{2}H_2O$) is input in amounts greater than 17.2%, with $H_2O$ (Water) remaining at a nominal value of 31.1 weight percent of the solid constituents.

The remaining additives representing less than 1.5% of the overall mix in total combined addition remain essentially the same. However, it is understood that the changes in the ratios between the MgO, MKP and $CaSO_4 \cdot \frac{1}{2}H_2O$ to achieve desired yields requires appropriate stoichiometrical changes of the three constituents.

To generate equivalencies of both Syngenite and Struvite-K—the reactions must be balanced in a way to enable the second exothermic reaction to exist within the 180° F. to 212° F. (82.2-100° C.) temperature range, but reducing the temperature rise from and time of the exothermic reaction will also reduce the ratio of Struvite-K yield. It has been found that the mixture as set forth above provides a significantly greater yield of the Struvite-K, up to 67%, than heretofore provided by known processes, with a minimum of additional necessary inputs or costly process steps or additives.

In the end, the gypsum component makes the inventive board panel more affordable to a variety of consumers. The final board panel product provides for a dramatic improvement both in physical characteristics and in long-term performance over conventional gypsum panels. The products are naturally UV resistant, that is, the are capable of protecting against penetration of ultraviolet rays, so no need exists for performance surface coatings. The products are extremely water resistant. A similar product was described by Surace in GB 2,445,660, equivalent to U.S. Pat. Pub. No. 2008/171,179. While the described board was capable of being produced in a continuous and/or batch process, Surace clearly teaches that the use of hemihydrate gypsum stucco is to be avoided because of the requirement of significant energy input needed to dry the hemihydrate. In the above described product, simultaneous production of Syngenite causes a stoichiometric reaction that requires no added external heat for drying, the exothermic reaction thereby providing the necessary thermal energy for the endothermic reaction. That is, the reaction of the hemihydrate with the monopotassium phosphate (MKP) provides the heat of reaction utilized for driving the second reaction, as above.

In use, boards having the specified compositions of Struvite-K in specified ratios to the Syngenite can be tailored for specific desired uses. An initial attempt to provide a light weight board panel included the following steps to obtain a sample result:

The initial base material formulation was a 1:1:1 mixture, that is, comprising in equal proportions MgO:MKP—$(KH_2PO_4)$: stucco (hemihydrate $CaSO_4 \cdot \frac{1}{2}H_2O$), with the MgO, MKP and hemihydrate gypsum being added in doses of 15 g each as dry powder to the mixer and dry premixed for 45 seconds to ensure homogeneity of the materials. Other, and for the main reaction, optional, material additions were 0.03 g silicone oil, such as polymethylhydrogensiloxane, and a dispersant, comprising 0.05 g polynapthalene sulfonate.

To this base mixture, following the dry mix for all samples below, 17 g water ($H_2O$) was added. This base mixture was then used for several lab runs, by the additions of varying materials for testing purposes, as noted in the table below, and several samples as listed in TABLE 2 were tested. The mixture, including the water, was mixed in a mixer (by hand) for a period of about 30 to 60 seconds in a first phase, and then allowed to partially set and then mixing was again begun on the product which had partially set around the outside in a shell structure, leaving a central core still in a liquid state. When the mixing was begun in the second phase, the set outer shell immediately went back into solution, and after mixing again for about 30 to 45 seconds, the material was allowed to set completely.

TABLE 2

| Sample No. | Utilizing the above Base formulation, the following materials were added by weight |
|---|---|
| 1 | boric acid ($H_3BO_3$) 1 g |
| 2 | $H_2SO_4$ 0.05 g |
| 3 | $H_2SO_4$ 0.05 g + boric acid ($H_3BO_3$) 0.25 g |
| 4 | $H_2SO_4$ 0.05 g + ($H_3BO_3$) boric acid 0.50 g |
| 5 | $H_2SO_4$ 0.05 g + boric acid ($H_3BO_3$) 0.25 g + an extra 2.25 g $H_2O$ |
| 6 | $H_2SO_4$ 0.05 g + boric acid ($H_3BO_3$) 0.25 g + extra 7.5 g $KH_2PO_4$ (1.5x of base form.) |
| 7 | $H_2SO_4$ 0.05 g + boric acid ($H_3BO_3$) 0.25 g + extra 15 g $KH_2PO_4$ (2x of base form.) |
| 8 | Same as the base, except the ratio is 1:2:1 of the MgO:MKP - ($KH_2PO_4$):stucco hemihydrate ($CaSO_4 \cdot 1/2H_2O$) |

For each of these samples, the resulting materials were analyzed for content, and homogeneity. Quantitatively, TABLE 3 below shows the results, and these are similar in format to those of TABLE 1 above.

TABLE 3

| Sample no. | $KMgPO_4 \cdot 6H_2O$ (Struvite-K) (wt. %) | $K_2Ca(SO_4)_2 \cdot H_2O$ (Syngenite) (wt. %) | Unreacted MgO (Periclase) (wt. %) | $CaSO_4 \cdot 0.67H_2O$ (Bassanite) (wt. %) |
|---|---|---|---|---|
| 1 | 23.1 | 46.6 | 29.1 | 1.2 |
| 2 | 20.0 | 49.2 | 29.9 | 1.0 |
| 3 | 18.7 | 48.8 | 31.5 | 1.0 |
| 4 | 19.4 | 47.4 | 32.2 | 1.0 |
| 5 | 23.0 | 47.4 | 28.6 | .9 |
| 6 | 20.1 | 33.9 | 42.2 | 3.9 |
| 7 | 58.8 | 24.0 | 7.3 | 9.9 |
| 8 | 52.8 | 29.8 | 16.1 | 1.3 |

In addition to the above quantitative results, several observations were made, including that the process yielded a formulation that was process friendly and yielded a board with a stronger core. It was also determined that changing the timing of the reactions by, for example, increasing mix time from one stage to two stages ranging from 45 to 90 seconds yielded a stronger core material with water resistance without need for wax or silicone. This is presumed to result form a higher Struvite-K yield. Finally, a close microscope examination of the set materials indicated that in many of the samples, crystallization occurred in a non-homogenous way in the final materials. That is, well formed crystallization occurred. The crystals, believed to be Struvite-K crystals, were determined to have formed in a boundary layer around the void spaces and between the voids and rest of the mixed product. A photomicrograph of one of these is shown in FIG. 1. As can be seen, the photomicrograph shows crystallization of the boundary between the void space and the surrounding matrix. This is understood to comprise a crystalline Syngenite/Struvite-K structure, resulting in better structural rigidity in the resultant composition.

A second batch of lab test using a similar procedure was run as set forth above. The following TABLE 4 shows the sample constituents again using a base mixture as follows: 15 g MgO, 15 g MKP ($KH_2PO_4$), 0.15 g $H_2SO_4$, 0.25 g boric acid ($H_3BO_3$), 0.05 g dispersant. One difference in this base structure from the one in TABLE 2 above is that the amount of stucco (hemihydrate $CaSO_4 \cdot \frac{1}{2}H_2O$) was varied, requiring an increase in water as well.

TABLE 4

| Sample No. | Utilizing the above Base formulation the following materials were added by weight |
|---|---|
| 1A | 15 g stucco, 20 g water |
| 2A | 20 g stucco, 24 g water |
| 3A | 25 g stucco, 28 g water |
| 4A | 30 g stucco, 32 g water |
| 5A | 35 g stucco, 36 g water |
| 6A | 40 g stucco, 40 g water |
| 7A | 50 g stucco, 48 g water |
| 8A | 60 g stucco, 56 g water |
| 9A | 15 g stucco, 27 g water, an extra 15 g MKP |

For each of these samples, the resulting materials were analyzed for content, and homogeneity. Quantitatively, TABLE 5 below shows the results, and these are similar in format to those of TABLES 1 and 3, above.

TABLE 5

| Sample no. | $KMgPO_4 \cdot 6H_2O$ (Struvite-K) (wt. %) | $K_2Ca(SO_4)_2 \cdot H_2O$ (Syngenite) (wt. %) | Unreacted MgO (Periclase) (wt. %) | $CaSO_4 \cdot 0.67H_2O$ (Bassanite) (wt. %) | $CaSO_4 \cdot 0.5H_2O$* (Bassanite) (wt. %) | $CaSO_4 \cdot 2H_2O$ (Gypsum) (wt. %) |
|---|---|---|---|---|---|---|
| 1A | 20.6 | 46.0 | 29.8 | 3.7 | <0.1 | <0.1 |
| 2A | 14.0 | 45.1 | 27.6 | <0.1 | 13.3 | <0.1 |
| 3A | x | 56.6 | 26.9 | <0.1 | 16.5 | <0.1 |
| 4A | x | 57.4 | 21.5 | <0.1 | 21.2 | <0.1 |
| 5A | x | 50.7 | 21.5 | <0.1 | 27.8 | <0.1 |
| 6A | x | 44.0 | 21.4 | <0.1 | 34.6 | <0.1 |
| 7A | x | 43.4 | 14.9 | <0.1 | 41.7 | <0.1 |
| 8A | <0.1 | 45.5 | 11.0 | <0.1 | 43.5 | <0.1 |
| 9A | 66.2 | 27.0 | 6.8 | x | <0.1 | <0.1 |

Additional samples, deviating from the 1:1:1 ratio of the previous mixtures and not using the base composition of the first eight samples, were made up by use of the following formulations listed individually in TABLE 6 below:

TABLE 6

| Sample No. | Constituent materials | MgO/MKP Ratio |
|---|---|---|
| 11A | 15 g MgO, 50.65 g MKP, 33.52 g water (stoichiometric struvite production) | 1:3.38 |
| 12A | 15 g MgO, 7.5 MKP, 20 g stucco, 24 g water, + 0.15 g $H_2SO_4$ + 0.25 g boric acid ($H_3BO_3$) + 0.05 g dispersant | 2.0:1.0 |
| 13A | 15 g MgO, 7.5 MKP, 30 g stucco, 32 g water, + 0.15 g $H_2SO_4$ + 0.25 g boric acid ($H_3BO_3$) + 0.05 g dispersant | 2.0:1.0 |
| 14A | 15 g MgO, 7.5 MKP, 40 g stucco, 40 g water, + 0.15 g $H_2SO_4$ + 0.25 g boric acid ($H_3BO_3$) + 0.05 g dispersant | 2.0:1.0 |
| 15A | 15 g MgO, 7.5 MKP, 50 g stucco, 48 g water, + 0.15 g $H_2SO_4$ + 0.25 g boric acid ($H_3BO_3$) + 0.05 g dispersant | 2.0:1.0 |

For each of these samples, the resulting materials were analyzed for content, and homogeneity. Quantitatively, TABLE 7 below shows the results, and these are similar in format to those of TABLES 1, 3, and 5 above.

TABLE 7

| Sample no. | $KMgPO_4 \cdot 6H_2O$ (Struvite-K) (wt. %) | $K_2Ca(SO_4)2 \cdot H_2O$ (Syngenite) (wt. %) | Unreacted MgO (Periclase) (wt. %) | $CaSO_4 \cdot 0.67H_2O$ (Bassanite) (wt. %) | $CaSO_4 \cdot 0.5H_2O$* (Bassanite) (wt. %) | $CaSO_4 \cdot 2H_2O$ (Gypsum) (wt. %) | $Mg(OH)_2$ (Brucite) |
|---|---|---|---|---|---|---|---|
| 11A | No data available | | | | | | |
| 12A | <0.1 | 36.3 | 21.2 | <0.1 | 19.9 | <0.1 | 22.6 |
| 13A | <0.1 | 33.2 | 10.8 | <0.1 | 29.5 | x | 26.5 |
| 14A | <0.1 | 27.0 | 4.3 | <0.1 | 36.8 | 12.1 | 19.8 |
| 15A | x | 30.6 | 5.6 | <0.1 | <0.1 | <0.1 | 25.9 |

As is evident in samples 12A-15A, a significant amount of the Magnesium oxide (MgO) failed to take part in the main reaction and instead generated a significant amount of a reaction by-product of a mineral identified as Brucite, $(Mg(OH)_2)$, which was not present in the other samples. It is considered that an excess of MgO which was dissolved at a higher temperature caused the precipitation of the Brucite by-product.

Figure 2:
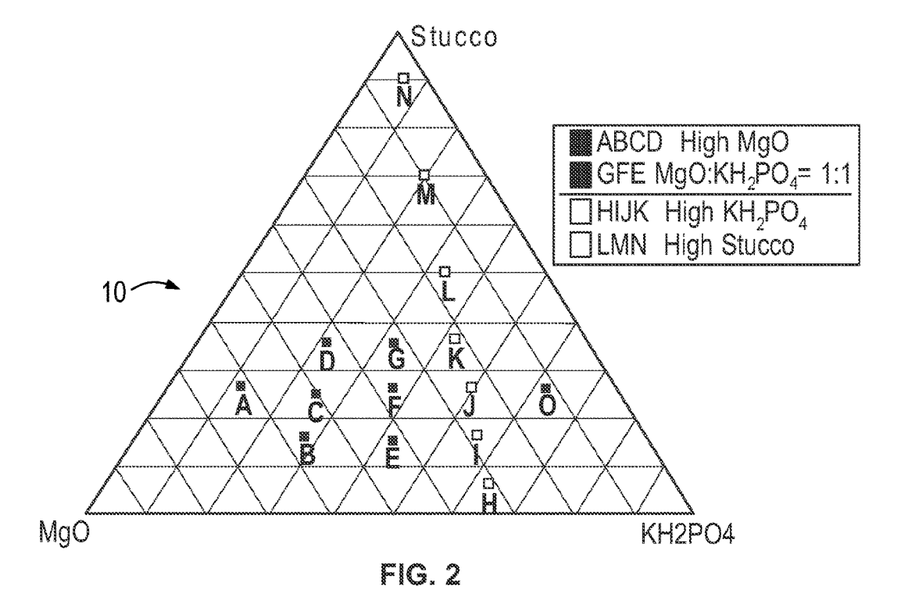
FIG. 2 is a ternary graph showing the proportions of MgO:MKP:stucco for specified trial runs and plots the various formulations used in the testing regime.

A third lab test of fifteen samples was conducted by continuously mixing raw materials at specified rate and time. This test run was specifically directed to determine the effect of change in ratios of raw materials on the properties of the product and which variables in production affect different specified characteristics, such as product yields. Water demand was different for different regions in the diagram. As a visual aid, the solid constituents have been mapped in a ternary diagram 10 (FIG. 2) and tabulated in TABLE 8 by weight percent. As can be seen from a comparison of the point plots of the different formulations in the phase diagram 10, some data points, e.g., L, M and N are high stucco formulations, A-D are high MgO formulations, and the group comprising H-N are high MKP ($KH_2PO_4$) formulations, while E, F and G are essentially equally weighted between MgO and MKP. As can be seen by the linear progression of the connecting lines in the vertical directions, a pattern was intended to maintain a constant ratio between MgO and MKP while varying only the stucco content. In the horizontally aligned points, the stucco content is maintained constant and the ratio between MgO and MKP is varied. The results obtained on the strength and presence of Struvite-K are set forth in TABLE 8. Optimized strength performance for acceptable cost was obtained for at least formulation J.

The characteristics tested for in the Sample J formulation were water absorption, shrinkage in a furnace muffle test (a direct indicator of fire resistance) and mechanical strength. No additives, such as boric acid, Polysiloxane, Lignosulfonate, Sulfuric acid, etc. were added to decouple the effect of additives from raw materials. To isolate the variable tested for, only the four essential constituents were utilized including the group magnesium oxide (MgO), Mono-Potassium Phosphate-MKP ($KH_2PO_4$), stucco ($CaSO_4.\frac{1}{2}H_2O$) at specified process parameters. The samples had the formulations with the water comprising 31 weight % of the final mixture:

TABLE 8

| Sample ID | The formulations of the following solid materials only, by weight percent, and water added 30% | Same formulation including 31 weight percent of water |
| --- | --- | --- |
| A | MgO 62.5, MKP ($KH_2PO_4$) 12.5, stucco 25.0, water | MgO 43.75, MKP ($KH_2PO_4$) 8.75, stucco 17.50, water 30.0 |
| B | MgO 57.67, MKP ($KH_2PO_4$) 28.33, stucco 15.0, water | MgO 39.67, MKP ($KH_2PO_4$) 19.83, stucco 10.5, water 30.0 |
| C | MgO 50.0, MKP ($KH_2PO_4$) 25.0, stucco 25.0, water | MgO 35.0, MKP ($KH_2PO_4$) 17.50, stucco 17.50, water 30.0 |
| D | MgO 43.33, MKP ($KH_2PO_4$) 21.67, stucco 35.0, water | MgO 30.33, MKP ($KH_2PO_4$) 15.17, stucco 24.50, water 30.0 |
| E | MgO 42.50, MKP ($KH_2PO_4$) 42.50, stucco 15.0, water | MgO 29.75, MKP ($KH_2PO_4$) 29.75, stucco 10.5, water 30.0 |
| F | MgO 37.5, MKP ($KH_2PO_4$) 37.5, stucco 25.0, water | MgO 26.25, MKP ($KH_2PO_4$) 26.25, stucco 17.50, water 30.0 |
| G | MgO 32.5, MKP ($KH_2PO_4$) 32.5, stucco 35.0, water | MgO 22.75, MKP ($KH_2PO_4$) 22.75, stucco 24.50, water 30.0 |
| H | MgO 31.67, MKP ($KH_2PO_4$) 63.33, stucco 5.0, water | MgO 22.17, MKP ($KH_2PO_4$) 44.33, stucco 3.50, water 30.0 |
| I | MgO 28.33, MKP ($KH_2PO_4$) 56.67, stucco 15.0, water | MgO 19.83, MKP ($KH_2PO_4$) 39.67, stucco 10.5, water 30.0 |
| J | MgO 25.0, MKP ($KH_2PO_4$) 50.0, stucco 25.0, water | MgO 17.5, MKP ($KH_2PO_4$) 35.0, stucco 17.5, water 30.0 |
| K | MgO 21.67, MKP ($KH_2PO_4$) 43.33, stucco 35.0, water | MgO 15.17, MKP ($KH_2PO_4$) 30.33, stucco 24.5, water 30.0 |
| L | MgO 16.67, MKP ($KH_2PO_4$) 43.33, stucco 50.0, water | MgO 11.67, MKP ($KH_2PO_4$) 23.00, stucco 49.0, water 30.0 |
| M | MgO 10.0 MKP ($KH_2PO_4$) 33.33, stucco 70.0, water | MgO 7.0 MKP ($KH_2PO_4$) 14.33, stucco 70.0, water 30.0 |
| N | MgO 3.33, MKP ($KH_2PO_4$) 6.67, stucco 90.0, water | MgO 2.33, MKP ($KH_2PO_4$) 4.67, stucco 63.0, water 30.0 |
| O | MgO 12.5, MKP ($KH_2PO_4$) 62.5, stucco 25.0, water | MgO 8.75, MKP ($KH_2PO_4$) 43.75, stucco 17.5, water 30.0 |

It should also be appreciated that the weight percent of water in Sample J set forth above was nominally set a 31 weight percent, the percentage of water relative to the solid constituents can also be varied anywhere from 15 to 40 weight percent, with 25-31 weight percent being nominally used as a benchmark for having a sufficient amount of solvent to initiate the reaction of the constituents.

It is also important to recognize that water temperature is a critical factor in the process. Specifically, the temperature of the water as it is added to the solid constituents is an important consideration as it affects the rate of reactivity of the constituents. An increase in the temperature of the water increases the time that must pass for the slurry to set. Standard water temperature is at room temperature, about between 20.0° C. and 25° C. Thus, it is important to monitor and control the reaction rates to maintain the integrity of the resulting product. Too high a temperature, that is, over 50° C., can lead to cracking of the surface during the hardening process as the slurry sets, although a trend has been found increased temperature coupled with reduction of liquid solvent may be desirable.

From the testing regime, the following clear trends for characteristics have been determined: The inventive magnesium phosphate (Struvite-K/Syngenite) compositions exhibited significantly improved compression strength, water absorption and fire resistance compared to a simple Gypsum composition. Moreover, it has been determined that the product characteristics are indeed tunable with variables in the process parameters and raw material ratios and properties thereof. For example, those samples processed at a higher temperature with lower water content exhibited higher compressive strength. Samples with higher shear rate/time exhibited higher compressive strength and marginal decrease in fire and water resistance. Shear rate and time is the vigor with which the mixture is mixed in a mixer, the amount of time the mixing process proceeds and whether the mixing was done by hand or mechanically.

Samples with MgO calcined at higher temperatures exhibited higher strength, samples with coarser MgO exhibited lower strength. This appears to exhibit an opposite behavior to that of water absorption and fire shrinkage properties. The one sample discussed above, Sample J, has been found to have the most efficacious and optimal properties in the resulting formulation, such as compression strength, which result has been attributed to the high Struvite-K content.

Figure 4:
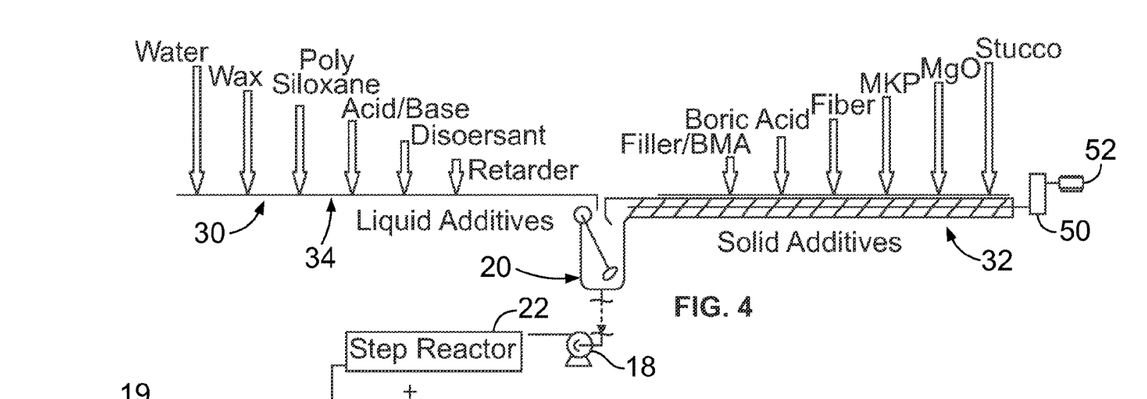
FIG. 4 is a side view showing in a schematic the chemical constituents that are loaded into a mixer to facilitate the mixture of elements to produce the inventive composite material.

Referring now to FIGS. 3 and 4, an in-line and continuous process for manufacture of board panels is proposed. A plug flow mixer 20 is shown in FIG. 3, having an inlet aperture 22 and an outlet aperture 24. While a plug flow is shown as an example, other types of mixers, for example, a step reaction mixer, can be used to effectuate this process, as will be recognized by those having skill in board manufacturing processes. Shown by the arrow at the inlet aperture 22, is the point at which the starting constituent materials are input into the mixer 20 the process occurring continuously in plug flow mixer 20 provides for even mixing thereof.

In addition to mixing the constituents, plug flow mixer 20 provides for the reactions in the mixer as the constituents reach different stages in the mixer 20. The constituent materials, are set forth in various embodiments above, are input into the inlet from two streams of input constituents, as shown in FIG. 4. A liquid constituent stream 30, on the left side of the schematic view of FIG. 4, shows the input of liquid constituents, including required constituents, such as water, and optional but preferred ones such as wax, polysiloxane, Acid/Base (as needed), a dispersant and a retarder. From the stream 32 shown on the right side of FIG. 4, the required constituents comprise the constituents MgO, MKP ($KH_2PO_4$) and stucco (hemihydrate), which are input through the screw conveyor 32 driven by a motor 52 and crank 50. Optional and preferred constituents include filler/ball mill additive as an accelerator, Boric acid, and fiber. Stream 30 feeds the constituent materials by piping 34 or other appropriate means, and the solid constituent stream 32 may be fed by a conveyor 32 by the motor 52/crank 50 or other appropriate means. Both of these streams provide input constituents to the mixer 20 which includes one or more mixer devices 38A, 38B, 38C, shown schematically in FIG. 4.

Referring again to FIG. 3, the mixer 20 is shown in more detail with the different mixer devices 38A, 38B and 38C shown in the staged mixing process of the step reaction mixer 20. As is shown, there are various levels of the mixing constituents that are occurring as the constituent materials are mixed in stages to create the optimal conditions for the different reactions which are occurring at different points (vertically as shown in FIG. 3) and at different times with respect to the process step as to which part of the reaction is occurring. That is, the time that the constituent materials take to be mixed, react and flow from the top material inlet 22 to the outlet 24 is a set time governed by the process parameters and mixing steps. These are conducted to take into account the process and mixing times as the materials descend through the stack in the reactor mixer 20 due to the force of gravity. As labeled along the longitudinal (vertical) direction of the mixer 20, the times that have elapsed of the constituent/reaction products in the mixer 20 are correlated with the depth level within the reactor chamber 23.

As is shown in FIG. 3, the materials as these are deposited into the reactor chamber 23 of mixer 20, are continually mixed by the mixer devices 38A, 38B and 38C at the appropriate times during the reaction process to obtain the desired products and any by products. As the second part of the reaction, that of the Struvite-K subreaction, is exothermic, the unset mixture of Syngenite, Struvite-K and gypsum, designated as a stream of product or reactant mixture 42, flows out of the outlet 24 at an elevated temperature onto the conveyor 40, moving in the direction of the arrow. It is further processed in accordance with known board panel processes. For example, an optional mat 44 of reinforcing randomly aligned glass fibers can be unrolled and paid out from a roll 46 of the material of mat 44 and laid over the product or reactant mixture 42, as it is being transported by the conveyor belt 40 in the direction of the horizontal arrow.

While a plug flow mixer 20 is shown in FIGS. 3 and 4, other types of mixers and delivery vehicles are contemplated by this invention. For example, a single phase constantly stirred tank reactor may be provided for continuous manufacturing of a stream of the inventive material. Inputting all of the reactant constituents together in a single vessel of the appropriate size, and allowing the mixing process to proceed for a total predetermined reaction time depending on the reactant products desired. The reactant constituents would be continuously mixed and the residence time of the reactant constituents would vary at the point that the product stream is withdrawn from the single mixing chamber.

As well, other configurations are contemplated, depending on the final desired product. A constantly stirred tank reactor (CSTR) providing the constituents a residence time approximating half of the total time for the total reaction would be followed by a true plug flow reactor, such as mixer reactor 20, having piping of appropriate length and diameter with interspersed static mixers to provide the remaining reaction time required prior to placing on a manufacturing belt. As the belt moves the reaction products along the manufacturing line, the reaction would more closely approach completion to allow the product to be roughly cut into appropriate lengths for further handling, and may include a set time for drying and final cutting to length so as to provide a finished board panel product. This process and mixing regime would produce a board product at the end of the manufacturing process that ideally should have an appropriate amount of free water therein contained to allow all reactants fully to reach the final composition.

Another option is for a series of three or more CSTR reactors linked in series so that the reaction will be at more advanced stages in each reactor as the flow progresses through the series. The product from the series of reactors would be delivered to a manufacturing belt where the reaction would more closely approach completion to allow the product to be roughly cut into appropriate lengths for further handling, including any drying required and final cutting to length of the finished product.

A sample board production in an inline production was run on an actual board manufacturing forming line, in which the lab runs were scaled up by about 100 times to test if the process is feasible for use in board panel production utilizing the inventive material combinations. Essentially the same formulations, that is, a 1:2:1 ratio, were utilized, as discussed below. All the amounts were scaled up, and a much larger mixer and reactor vessel or chamber 23 was required. The procedure was also modified in significant ways to enable the continuous, rather than batch, production of the inventive material compositions for use in a board line running at almost normal speed of running or a round 40 feet per minute of conveyor belt 40 in accordance with the description of the embodiments referenced to FIGS. 3 and 4 above.

Figure 5:
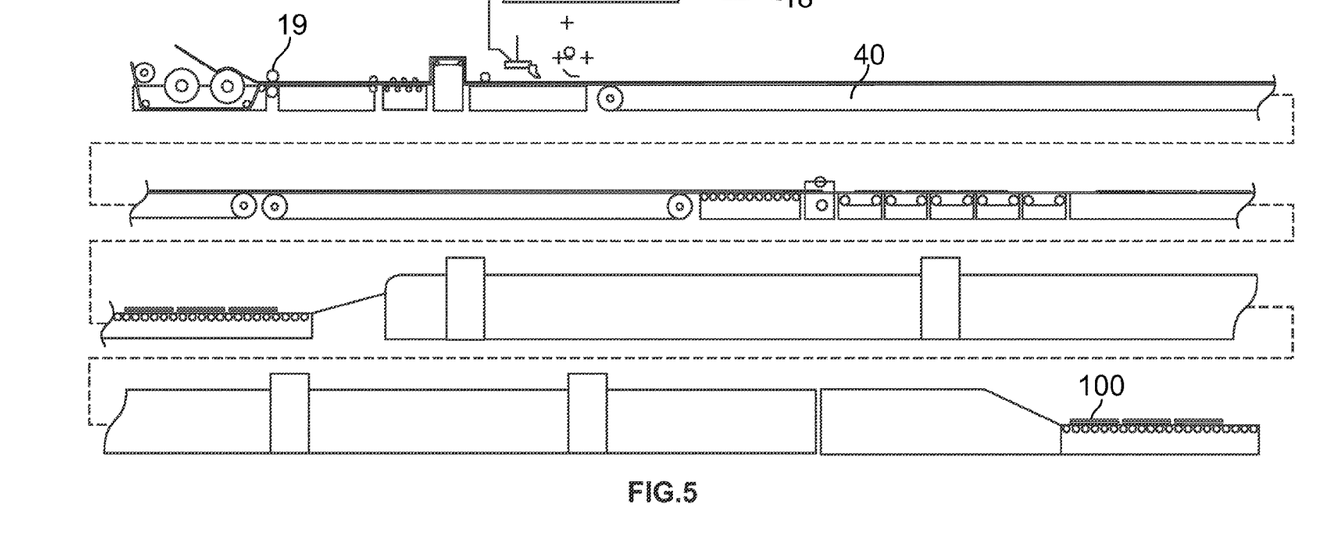
FIG. 5 is a side view in several sections schematically showing a board production line such as may be utilized in the production of the inventive board panels.

Certain additional equipment was required for this production run not needed in the lab runs as shown in FIG. 5. This equipment includes a tank reactor 21, a mixer 20, one or more pumps 18, a roller coater 19, two may be preferred, one for each of the two surface layers. A core gypsum mixer and pump for providing a continuous flow of the core gypsum, that is, the lightweight core gypsum, that will make up the central layer that will ultimately comprise the central or core layer having little if any of the Struvite-K and Syngenite reaction products is also provided but not shown in FIGS. 3 and 4. Thus, the final desired product is to be a surface layer coated with the inventive material compositions "wrapped around" a lightweight gypsum core, as will be discussed with respect to the board embodiments of FIGS. 6-11 below.

Referring now to FIGS. 3-5, the procedure to manufacture the surface layer coatings is essentially the same as those described above, except adjustments are required to be made for the vastly increased scale of the constituent materials. The following step-by-step procedure is expected to produce the necessary coating layers.

Pre-mix the solid mixture, comprising a 1:2:1 ratio, that is, MgO:MKP—$(KH_2PO_4)$:stucco (hemihydrate $CaSO_4.½H_2O$) the pre-mix phase to last from between 30 to 60 seconds. To ensure that enough of the slurry mixture is made, about 15 kg of each of the base constituents is provided. Proportional amounts of siloxane, a defoamer, and a dispersant, such as polynapthalene sulfonate, may be added to this mixture and water in about the same weight proportion, or about 17 kg, is added to the dry constituents.

Mix the resulting slurry for between 30 to 60 seconds in the large continuous mixer 20. After 15 seconds of mixing, the mixture started to solidify. It has been found that continued mixing will re-liquify the mixture. This is Phase I mixing. Upon finishing with this initial Phase I mixing time, a timing sequence was commenced. Each minute after this initial Phase I mixing time, the mixture was again mixed vigorously for 5 second periods separated by 55 second intervals. This is the Phase II mixing.

The formulation used in the production run causes the product to set-up anywhere from 5-20 minutes after the water is added to the powder mixtures. Due to the type of mixer used, however, the mixing occurred unevenly and no product was obtained out of the mixer/reactor in any appreciable amounts for technical reasons.

Referring now to FIGS. 6-11, the board panel products in different configurations are shown as separate board panel embodiments. Board panels may comprise multiple facer materials, preferably one or two, but the invention contemplates even no facer materials. Such facer materials may be of paper, fiberglass, thermoplastic or other materials in a closed or open mesh or weave, or any other appropriate configuration. When a random glass mat is used as the carrier for both the top and bottom faces of the resultant board panel, the reacted slurry is deposited upon these carriers at a forming station, and then provided to a shaping device, such as an extruder or rollers, that determine the final board thickness.

Figure 6:
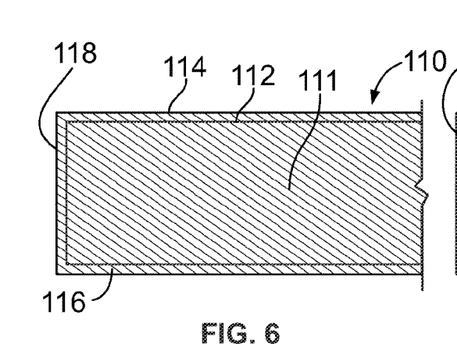
FIG. 6 is a cross-sectional side view of one embodiment of an inventive board panel.

In FIG. 6, the composite Syngenite-Struvite-K material board 110 is shown in cross-section having a central gypsum core 111. All surface layers including the top 114, bottom 116 and side 118 surfaces of the panel 110 have Syngenite-Struvite-K-gypsum material coming directly from the reactor mixer 20 (FIG. 3) overlaying the gypsum core. The composite Syngenite-Struvite-K material is that directly ejected from the outlet 22 reactor mixer 20 (FIG. 3). It is also possible to embed a mat of reinforcing glass fibers 112 within the top 114, bottom 116 and side 118 surfaces of the panel 110.

Figures 7, 8, 10:
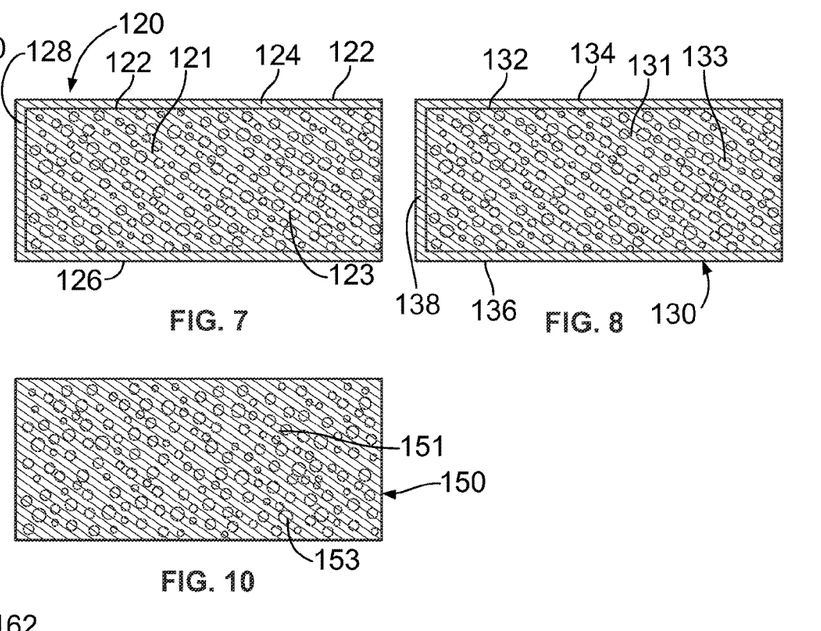
FIG. 7 is a cross-sectional side view of another embodiment of an inventive board panel.
FIG. 8 is a cross-sectional side view of yet another embodiment of an inventive board panel.
FIG. 10 is a cross-sectional side view of another embodiment of an inventive board panel.

In FIG. 7, a Syngenite-Struvite-K material board 120 is shown in cross-section having a central core of lightweight core gypsum 121 having foamed or aerated bubbles 123 that are injected into the core layer 121, in accordance with known methods. All surface layers the top 124, bottom 126 and side 128 surfaces of the panel 120 have Syngenite-Struvite-K-gypsum material coming directly from the reactor mixer 20 (FIG. 3) overlaying the overlaying the gypsum core. A mat of reinforcing glass fibers 122 may be embedded within the surface layers of the top 124, bottom 126 and side 128 surfaces of the panel 120.

In FIG. 8, a Syngenite-Struvite-K material board 130 is shown in cross-section having a central core of lightweight composite Syngenite-Struvite-K material 131 having foamed or aerated bubbles 133 that are injected into the core Syngenite-Struvite-K layer 125, in accordance with known methods. All surface layers the top 124, bottom 126 and side 128 surfaces of the panel 120 have a dense, that is, unaerated or unfoamed, Syngenite-Struvite-K-gypsum material coming directly from the reactor mixer 20 (FIG. 3) overlays top 134, bottom 136 and side 138 surfaces of the lightweight composite Syngenite-Struvite-K material comprising the core 131. A mat of reinforcing glass fibers 132 may be embedded within the surface layers of the top 134, bottom 136 and side 138 surfaces of the panel 130.

Figure 9:
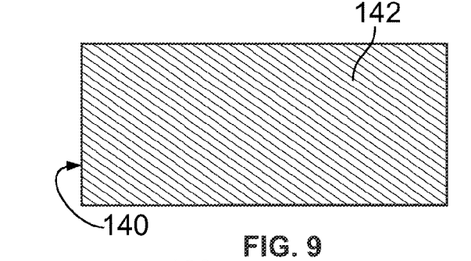
FIG. 9 is a cross-sectional side view of still another embodiment of an inventive board panel.

In FIG. 9, a Syngenite-Struvite-K material board 140 is shown in cross-section having a central core 142 of the composite Syngenite-Struvite-K-gypsum material coming directly from the reactor mixer 20 (FIG. 3), without any other reinforcing elements, as in the other embodiments described above.

In FIG. 10, a Syngenite-Struvite-K material board 150 is shown in cross-section having a central core 152 of the composite Syngenite-Struvite-K-gypsum material and having been foamed or aerated in accordance with known procedures, to include air or foam bubbles 143 within the core 141. No other reinforcing elements as in the other embodiments described above are provided for in this embodiment of Board 150.

Figure 11:
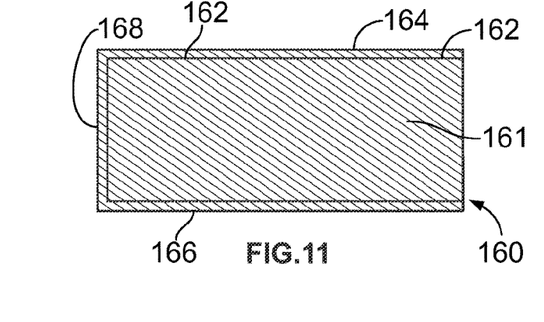
FIG. 11 is a cross-sectional side view of yet still another embodiment of an inventive board panel.

In FIG. 11, a Syngenite-Struvite-K material board 160 is shown in cross-section having a central core 161 comprising composite Syngenite-Struvite-K material coming directly from the reactor mixer 20 (FIG. 3). All surface layers, i.e., top 164, bottom 166 and side 168 surfaces of the panel 120 have a dense, that is, unaerated or unfoamed, layer over the core 161. A mat of reinforcing glass fibers 162 may be embedded within the surface layers of top 164, bottom 166 and side 168 surfaces of panel 160.

The invention herein has been described and illustrated with reference to the embodiments of FIGS. 1-11, but it should be understood that the features and operation of the invention as described are susceptible to modification or alteration without departing significantly from the spirit of the invention. For example, the variations in starting materials of the various elements, or the specified reaction conditions may be altered to fit specific applications and desired yields. Also, additional variations may be introduced to provide differences in the resulting materials. For example, alternative additives to the starting constituents may include, in combination and or permutations of the listing herein, Boric acid, Polysiloxane defoamer, Lignosulfonate, Sulfuric acid, deionized water, tap water, and others as these become relevant to affect the reactions.

Although the additives described above are provided as active constituents for assisting, buffering or otherwise inducing one or more of the reactions or subreactions to proceed, it is contemplated that the inventive composition and process may include other types of additives and fillers, such as limestone, sand, fibers in proportions of from between 1 to 3 weight percent of the total board weight. These may include short strand glass fibers (10-50 mm long and 10-80 μm in width), synthetic polymer fibers, paper, and agglomerations thereof, such as paper and wood. Other additives may include starches, such as migratory, native, acid thinned, cationic starch, ethylated starch or dextrin, or polymers, such as polyvinyl acetate, poly vinyl acetate-ethylene co-polymer, polyvinyl pyrrolidone, cross-linked with polystyrene sulfonate, polyvinyl alcohol, methyl cellulose, hydroxyethyl methyl cellulose, styrene-butadiene copolymer latex, acrylic ester latex, acrylic copolymer latex, polyester resin, epoxy resin, polymethyl methacrylate, or polyacrylic acid, all in the same proportional amounts of from between 1 to 3 weight percent of the total board weight.

In addition, the mixing process and speed may be varied to obtain more optimal desired results. Other variables that may be utilized to optimize results are used natural instead of Synthetic stucco, the order and timing of additions and ingredients may be varied, and with the introduction of productions runs, mechanical mixing of the constituents in for example, step reactors. Other variables that may have an effect on resulting ratios and products may include varying the state as well as the ratio of the raw constituent materials. These may include varying the addition rate, temperatures of the constituents, timing of additions, particle size, mix time, and other factors that may be determined as experience is gained with the reaction processes.

Accordingly, the specific embodiments illustrated and described herein are for illustrative purposes only and the invention is not to be considered as being limited except by the following claims and their equivalents.

What is claimed is:

1. A process for the continuous manufacture of a building product comprising:
    a) providing a mixer reaction chamber;
    b) continuously combining together constituent materials into the mixer reaction chamber; wherein the constituent materials comprise the following compounds in specified ranges by weight percent:
    MgO: 3.33 to 70.00%
    $KH_2PO_4$: 4.67 to 70.00%
    stucco hemihydrate ($CaSO_4.\frac{1}{2}H_2O$): 10.5 to 90.0%
    and addition of water: 15 to 60% of the constituent solid materials;
    c) continuously mixing the constituent materials within said mixing reaction chamber for a length of time sufficient to produce a slurry;
    d) withdrawing the slurry from the mixer reaction chamber; and
    e) utilizing said slurry in the manufacture of the building product.

2. The process according to claim 1 wherein the specified ranges by weight percent of said compounds are:

MgO: 10.0 to 40.0%
$KH_2PO_4$: 40.0 to 70.00%
stucco hemihydrate: 25.0 to 75.0%
and an addition of water in an amount of 15 to 60% by weight relative to the solid constituents.

3. The process according to claim 1 wherein the ratio of MgO to $KH_2PO_4$ is between 1:1.0 and 1:3.37.

4. The process according to claim 3 wherein the ratio of MgO to $KH_2PO_4$ is between 1:1.8 and 1:2.2.

5. The process according to claim 1, wherein the constituent materials further include a buffer, wherein the buffer comprises a rate retarding compound selected from one or more of boric acid ($H_3BO_3$) and sulfuric acid ($H_2SO_4$).

6. The process according to claim 5 wherein the constituent materials further comprise a defoamer, a dispersant comprising polynapthalene sulfonate, and a silicone oil selected from the group consisting of polysiloxane $(C_2H_6OSi)_n$, polydimethylsiloxane $(CH_3[Si(CH_3)_2O]_nSi(CH_3)_3)$, polydimethylsiloxane, and poly(methyl hydrogen) siloxane.

7. The process according to claim 1 wherein MgO, $KH_2PO_4$, and $CaSO_4.\frac{1}{2}H_2O$ react to produce in varying amounts $KMgPO_4.6H_2O$ and $K_2Ca(SO_4)_2.H_2O$.

8. The process according to claim 1 further comprising continuously feeding into the mixer reaction chamber one or more of the compounds selected from the group consisting of sulfuric acid, boric acid, siloxanes, and naphthalene sulfonate.

9. A lightweight building board panel comprising a building product composition manufactured by the process of claim 1, wherein said composition is disposed adjacent to at least one of the faces of the board panel.

10. A building board panel comprising at least one building composition disposed adjacent to at least one of the faces of the board panel, wherein the building composition comprises Struvite-K ($KMgPO_4.6H_2O$), Syngenite ($K_2Ca(SO_4)_2.H_2O$), and one or more of anhydrite gypsum, stucco ($CaSO_4.\frac{1}{2}H_2O$), hydrated gypsum ($CaSO_4.2H_2O$), and magnesium oxide (MgO).

11. A building board panel for use in building construction in which at least one of the faces comprises a composition comprising Struvite-K ($KMgPO_4.6H_2O$), Syngenite ($K_2Ca(SO_4)_2.H_2O$) and gypsum.

12. The board panel according to claim 10, wherein the amount of Struvite-K and Syngenite exceeds 10 weight percent of the building composition.

13. The board panel for use in building construction according claim 11, wherein the amount of Struvite-K ($KMgPO_4.6H_2O$) and Syngenite ($K_2Ca(SO_4)_2.H_2O$) comprising the face material exceeds 10 weight percent.

14. The board panel according to claim 10, wherein at least one of the building compositions comprises Struvite-K in an amount of from 0.1 to 67.0 weight percent; Syngenite in an amount of from 2.5 to 60.0 weight percent; and one or more of anhydrite gypsum, stucco, hydrated gypsum, and magnesium oxide making up the remaining building composition.

15. The board panel according to claim 10, wherein at least one of the building compositions comprises Struvite-K in an amount of from 15.1 to 37.0 weight percent; Syngenite in an amount of from 12.5 to 46.0 weight percent; and one or more of anhydrite gypsum, stucco, hydrated gypsum, and magnesium oxide making up the remaining building composition.

16. The process of claim 1, wherein the building product is a building board panel.

17. The process of claim 1, wherein the building product is a wall board panel or a ceiling tile.

18. The process of claim 1, wherein utilizing said slurry in the manufacture of the building product comprises allowing the slurry to set and dry to form a solid building composition.

\* \* \* \* \*